No. 787,538. PATENTED APR. 18, 1905.
T. E. OPP.
HAME STAPLE AND CLIP.
APPLICATION FILED OCT. 31, 1903.
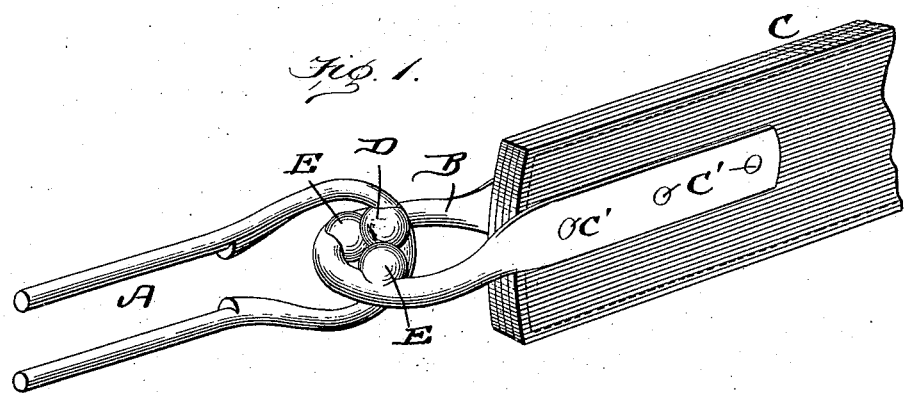
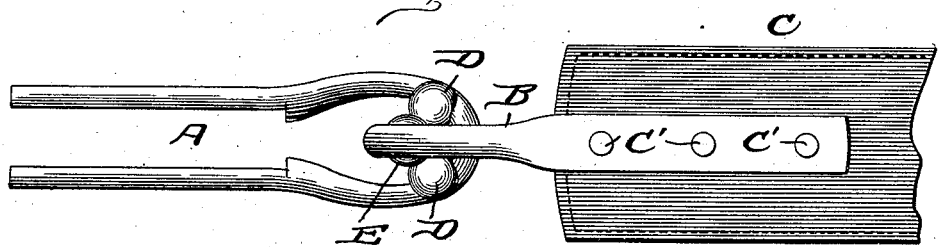
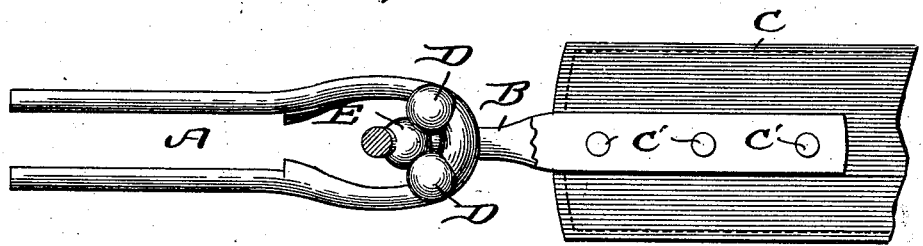
Witnesses
Inventor
T. E. Opp.
By
Attorneys No. 787,538. Patented April 18, 1905.

UNITED STATES PATENT OFFICE.

THOMAS E. OPP, OF CAMBRIA, IOWA.

HAME-STAPLE AND CLIP.

SPECIFICATION forming part of Letters Patent No. 787,538, dated April 18, 1905.

Application filed October 31, 1903. Serial No. 179,361.

*To all whom it may concern:*

Be it known that I, THOMAS E. OPP, a citizen of the United States, residing at Cambria, in the county of Wayne and State of Iowa, have invented a new and useful Hame-Staple and Clip, of which the following is a specification.

This invention is an improved form of hame-staple and clip, the two together constituting a coupling whereby the trace or tugs are connected to the hames.

The object of the invention is to provide a cheap, simple, and efficient construction of coupling the bearing parts of which will be so constructed as to turn or move freely upon each other, thereby materially prolonging the usefulness of the coupling; and with these objects in view the invention consists, essentially, in the employment of two staples or clips arranged at right angles to each other, the bowed portion of each staple or clip being formed with spherical enlargements upon the inner side, said spherical enlargements being adapted to bear upon each other when strain is placed upon the coupling.

The invention consists also in certain details of construction hereinafter fully described, and pointed out in the claims.

In the drawings forming part of this specification, Figure 1 is a perspective view showing the practical application of my improved form of staple and clip or coupling. Fig. 2 is a side view of the same. Fig. 3 is a side elevation, partly in section. Fig. 4 is a detail perspective view of the parts of the coupling disconnected.

In carrying out my invention I employ a hame-staple A, which is connected to the hame in the usual manner, and interlocking with said staple is the U-shaped clip B, which is secured to the end of the trace or tug C by rivets C', as usual. Both the hame-staple A and the clip B are essentially U-shaped and are arranged at right angles to each other, as shown, the hame-staple being arranged vertically, while the clip is arranged horizontally, inasmuch as the trace or tug rests in a vertical position.

Spherical enlargements D are produced upon the inner sides of the staple adjacent the bend of the same, said spherical enlargements being arranged opposite each other, as most clearly shown in Fig. 3, and the clip B is formed also with spherical enlargements E adjacent the bowed end of the same, and when the coupling is complete the spherical enlargements D will bear against the spherical enlargements E, and said enlargements being smooth will turn freely upon each other and the usefulness of the staple and clip greatly prolonged.

In practice I prefer to have the balls or spherical enlargements formed of hardened steel, so that they will not easily wear by friction. It will be noted that the other portions of the staple and clip do not come in contact with each other and that the only bearing-points are upon the balls or spherical enlargements carried by the said staple and clip. It will also be understood that the staple and its enlargement are made integral and likewise the clip and its enlargement.

Having thus fully described my invention, what I claim as new, and desire to secure by Letters Patent, is—

1. A device of the kind described comprising a clip carrying inwardly-extending, spherical enlargements upon opposite sides of the bow portion of the clip, and a staple having spherical enlargements upon opposite sides of the bend and on the inner face of the staple, said enlargements being adapted to bear upon the enlargements of the clip and hold the clip from contact with the staple.

2. A device of the kind described comprising a staple having a plurality of spherical enlargements formed on its inner face, a clip having a plurality of spherical enlargements formed on its inner face and adapted to rock upon the enlargements formed on the staple, as and for the purpose set forth.

THOMAS E. OPP.

Witnesses:
A. D. McCULLOCH,
HARRY BOLON.